(12) United States Patent
Sansing

(10) Patent No.: US 7,104,799 B1
(45) Date of Patent: Sep. 12, 2006

(54) MATHEMATICS TEACHING TOOL

(76) Inventor: Martin Sansing, 447 Hillside La., Santa Monica, CA (US) 90402

(*) Notice: Subject to any disclaimer, the term of this patent is extended or adjusted under 35 U.S.C. 154(b) by 125 days.

(21) Appl. No.: 10/607,940

(22) Filed: Jun. 27, 2003

Related U.S. Application Data

(60) Provisional application No. 60/392,090, filed on Jun. 27, 2002.

(51) Int. Cl.
*G09B 19/02* (2006.01)

(52) U.S. Cl. .................. 434/195; 434/188; 434/191

(58) Field of Classification Search .............. 434/188, 434/191, 195, 196, 200, 202, 205, 209
See application file for complete search history.

(56) References Cited

U.S. PATENT DOCUMENTS

| | | | | |
|---|---|---|---|---|
| 1,081,815 A | * | 12/1913 | De La Rosa | 434/199 |
| 1,836,870 A | * | 12/1931 | Quer | 434/195 |
| 2,494,469 A | * | 1/1950 | Booth | 434/196 |
| 3,002,295 A | * | 10/1961 | Armstrong | 434/195 |
| 3,094,792 A | * | 6/1963 | Morgan et al. | 434/195 |
| 3,229,388 A | * | 1/1966 | Smith | 434/195 |
| 3,339,295 A | * | 9/1967 | Wanvig | 434/209 |
| 3,410,002 A | * | 11/1968 | Mulholland et al. | 434/195 |
| 3,414,986 A | * | 12/1968 | Stassen et al. | 434/195 |
| 3,935,649 A | * | 2/1976 | Harte | 434/195 |
| 4,177,581 A | * | 12/1979 | Walker | 434/200 |
| 4,334,869 A | * | 6/1982 | Wilcox et al. | 434/208 |
| 4,812,123 A | | 3/1989 | House | 434/195 |
| 5,120,226 A | * | 6/1992 | Tsai | 434/195 |
| 5,297,965 A | * | 3/1994 | Manancero | 434/195 |
| 5,421,732 A | | 6/1995 | Taylor | 424/195 |
| 5,597,308 A | * | 1/1997 | Woldenberg et al. | 434/196 |
| 5,971,269 A | * | 10/1999 | Baguley | 235/68 |
| 6,739,875 B1 | * | 5/2004 | Lin | 434/195 |
| 6,915,695 B1 | | 7/2005 | Weiss et al. | 73/579 |

OTHER PUBLICATIONS

ETA Cuisenaire Math Catalog, Grades K-12 (2003), pp. 32, 59, 82-93.
Summit Learning Math Catalog, Grades K-9 (Spring 2003), pp. 8, 16-19.
Nasco Math Catalog (2003), pp. 3-9, 34.

* cited by examiner

*Primary Examiner*—Kurt Fernstrom
(74) *Attorney, Agent, or Firm*—Knobbe, Martens, Olson & Bear LLP

(57) ABSTRACT

A mathematics education apparatus comprises a base array. The base array includes a plurality of rows, with each row having ten receiving positions. The mathematics education device further comprises a plurality of number pieces that each correspond to a number, including at least one number piece corresponding to numbers one through ten. Each number piece has a linear length that is proportional to the number corresponding to that number piece. Additionally, each number piece is configured to cover a quantity of receiving positions on the base array equal to the number corresponding to that number piece.

55 Claims, 7 Drawing Sheets

MATHEMATICS TEACHING TOOL

PRIORITY APPLICATION

This application claims the benefit of U.S. Provisional Application 60/392,090, filed 27 Jun. 2002, the contents of which are hereby incorporated by reference herein.

FIELD OF THE INVENTION

The present invention relates generally to an education tool for students learning mathematics, and relates particularly to a system for teaching such students arithmetic, place value concepts and number sense.

BACKGROUND OF THE INVENTION

A wide variety of products have been developed to assist students in learning fundamental arithmetic and mathematical concepts. For example, many products are configured to teach concepts such as counting or number sense, place value and the arithmetic operations of addition, subtraction, multiplication and division. Such products often include components such as counting pieces configured to be arranged geometrically and instruction sheets containing information regarding how the products can be used to teach certain mathematical concepts. For example, the "base ten blocks" system is an exemplary mathematics education system. The base ten blocks system comprises four sizes of counting pieces (ones, tens, hundreds and thousands), each representing a power of ten. The counting piece representing ones is a small cube; the counting piece representing tens is an elongated rod having the length of ten ones; the counting piece representing hundreds is a square having the area of ten tens; and the counting piece representing thousands is a large cube having the volume of ten hundreds. These counting pieces, which can be configured to connect to one another, help the student to understand the relationship between various base ten numbers, and thereby teach the concept of place value.

Another exemplary mathematics education system is the "number rods" system. This system comprises a series of colored rods of various lengths representing the numbers one through ten. Number rods can be used to teach addition and subtraction by having the student compare the rods corresponding to the numbers of interest. For example, the rod representing the number 2 and the rod representing the number 3 can be aligned and placed alongside the rod representing the number 5 to illustrate a basic "math fact" such as 2+3=5, or 5-2=3. In some embodiments, a number rods system further comprises one or more linear, separate, numbered tracks, each consisting of a single row, that are labeled with numbers to assist the student in performing arithmetic functions and learning math facts.

Basic math facts can also be taught using a "hundreds board" system. Hundreds boards generally consist of a flat board with a 10×10 grid (some teachers just use a photocopied sheet). In the grid are the numbers 1 through 100, starting at one in the upper left, proceeding across the first row to 10, repeating starting on the next row 11–20, and so on. The grid and numbers may simply be printed on, or the board may be configured so that the individual squares can hold tiles or other objects. The boards often come with individual tiles that can be placed on top of individual numbers on the board. The board is useful for counting and teaching basic math facts. To add 15+18, a student would typically count to 15, place down a tile or object, and then count out 18 from that point and place a second tile on the sum of 33. Disadvantageously, the hundreds board tends to reinforce counting-based arithmetic, which is precisely what advocates of base ten-oriented teaching are trying to discourage. A conventional hundreds board also does not allow students to manipulate the numbers 1–10 in the framework or easily perform arithmetic operations.

SUMMARY OF THE INVENTION

While the foregoing mathematics education systems can be used to teach various foundational mathematical concepts and arithmetic, such systems often fail to teach or adequately emphasize number sense and the concept of place value while teaching basic math facts and concepts. Knowledge of place value allows students to group numbers in their heads into more manageable units, such as tens and ones, thereby making it easier to visualize and mentally process them. Place value also helps students comprehend what larger numbers represent. For example, place value teaches students that the number 27 represents two 10's and a 7 and that it is not simply the number after 26, which is how a student taught by counting might describe it. Using place value also allows students to perform arithmetic without relying upon by rote memorization or counting, which are not efficient or practical when working with larger numbers. For these reasons, math teachers are placing increasing emphasis on teaching the concept of place value rather than simply requiring students to memorize and count. Thus, in accordance with the foregoing, it is desired to develop a mathematics education system that can be used to teach arithmetic operations such as addition, subtraction, multiplication and division, to facilitate a deeper understanding of numbers and to encourage the use of the concept of place value.

According to one embodiment of the present invention, a mathematics education apparatus comprises a base array. The base array includes a plurality of rows, with the rows having ten receiving positions. The mathematics education device further comprises a plurality of number pieces that correspond to a number, including number pieces corresponding to numbers one through ten. Each number piece has a linear length that is proportional to the number corresponding to that number piece. Additionally, each number piece is configured to cover a quantity of receiving positions on the base array equal to the number corresponding to that number piece.

According to another embodiment of the present invention, a mathematics education kit comprises a base array. The base array includes a plurality of receiving positions, with the receiving positions arranged in an array of rows and one or more columns. The mathematics education device further comprises a plurality of number pieces that correspond to a number. Each number piece has a linear length that is proportional to the number corresponding to that number piece. Each number piece is configured to cover a quantity of receiving positions on the base array equal to the number corresponding to that number piece. The mathematics education device further optionally comprises an instruction apparatus containing instructions for using the base array and number pieces to teach mathematical concepts.

BRIEF DESCRIPTION OF THE DRAWINGS

Embodiments of the present invention are described below with reference to the following figures, which are intended to be illustrative and not limiting.

DETAILED DESCRIPTION OF THE PREFERRED EMBODIMENT

Introduction.

As described above, existing mathematics education devices often fail to teach or adequately emphasize the concept of place value while teaching basic math facts and concepts. For example, while the base ten blocks system can be used to teach place value, it is difficult and cumbersome to use when teaching basic math facts such as 5+8=13 or to perform arithmetic operations because the numbers 2 through 9 must be represented by grouping together multiple ones pieces. To the contrary, the teaching of math facts and arithmetic operations is more easily accomplished using the number rods system because numbers are more easily represented using the various numbered pieces. However, the number rods system has the drawback of failing to adequately teach the concept of place value because the number rods are often used independent of any framework that would emphasize base ten numbers. Even when the rods are used with a track, the tracks are continuous and are not grouped in lengths that correspond to base ten numbers such as one, ten, and one hundred, or other number bases. Additionally, the hundreds board system overemphasizes counting by requiring students to count out each place on the board in order to arrive at an answer.

These and other disadvantages are addressed in various embodiments of the mathematics teaching tool described herein. An exemplary embodiment of a mathematics teaching tool comprises a base array onto which number pieces can be placed. This configuration allows and enables a student to become fluent in place value and base-ten concepts while also learning arithmetical, mathematical and numerical processes through physical manipulation of the number pieces onto the base array. This configuration also assists the student in understanding the commutative, associative and distributive properties of addition and multiplication. It can also be used to teach other mathematical concepts such as finding the least common multiple of two or more numbers.

Physical Configuration—Base Array.

Figure 1:
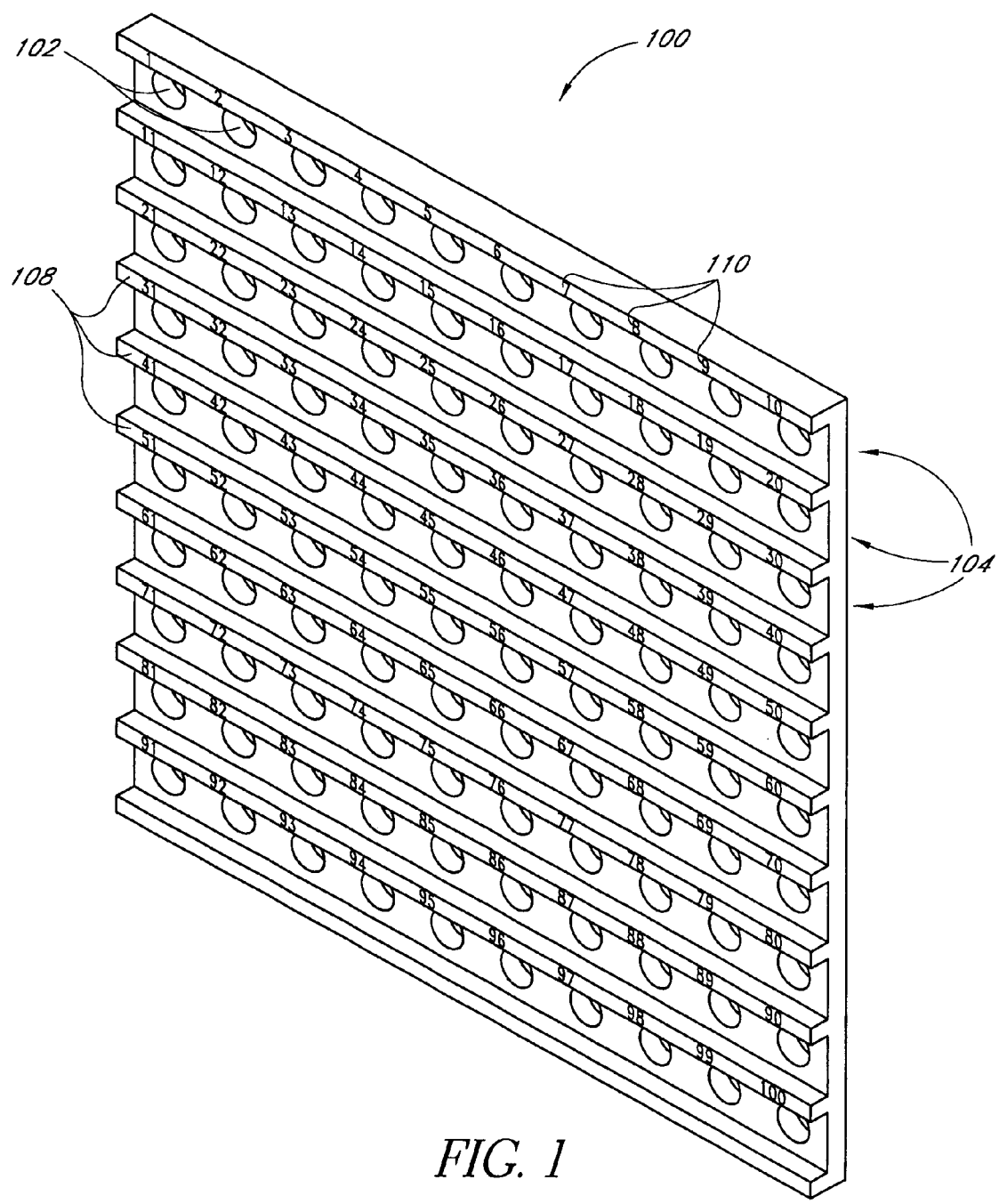
FIG. 1 is a perspective view of an exemplary base array configured for use as a mathematics teaching tool.

An exemplary embodiment of a base array 100 is illustrated in FIG. 1. The base array 100 comprises a plurality of receiving positions 102 arrayed into a plurality of rows 104. Although the illustrated base array 100 comprises ten rows and ten receiving positions per row, base arrays having other combinations of row quantities and receiving position quantities can used in other embodiments. For example, a base array with eight or sixteen receiving positions per row can be used to teach base-8 or base-16 arithmetic. In the embodiment illustrated in FIG. 1, the receiving positions 102 comprise recessed regions in the base array 100.

In the exemplary embodiment illustrated in FIG. 1, the rows 104 are separated by a plurality of gap regions 108 which include numerical labels 110 corresponding to the receiving positions 102. In the embodiment illustrated in FIG. 1, the gap regions 108 are elevated with respect to the rows 104, although in other embodiments the gap regions 108 are coplanar with the rows 104. In still other embodiments, the gap regions 108 are omitted. The numerical labels 110 can be positioned within or on the receiving positions 102.

The numerical labels 110 can also be positioned at a location above or below each row 104, such as in the gap regions 108. In addition, the numerical labels 110 can be positioned in order first from left to right and then from the top row down to the bottom row, much as the written word is laid out on a page (and as illustrated in FIG. 1). However, in other embodiments the numerical labels 110 can be positioned in other arrangements. For example, in a modified embodiment, the numerical labels 110 are positioned in order first from top to bottom and then from right to left. In such a modified embodiment, the receiving positions are disposed in vertical rows (which might also be referred to as "columns"). In addition, while the first receiving position in the embodiment illustrated in FIG. 1 is labeled "1", in other embodiments, the first receiving position can be labeled with other numbers.

Figure 2:
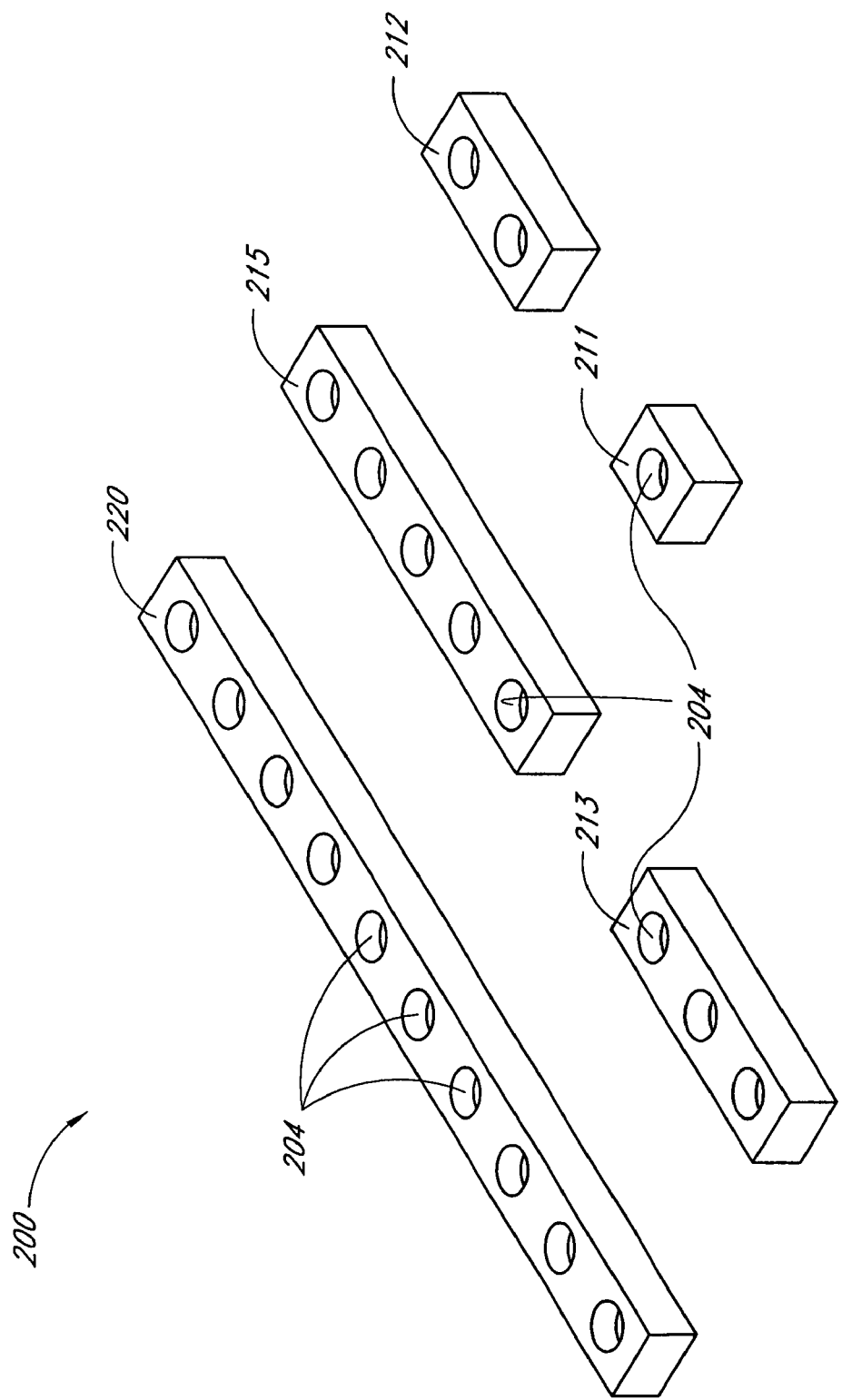
FIG. 2 is a perspective view of the top side of a plurality of exemplary number pieces configured for use with the base arrays described herein.
Figure 3:
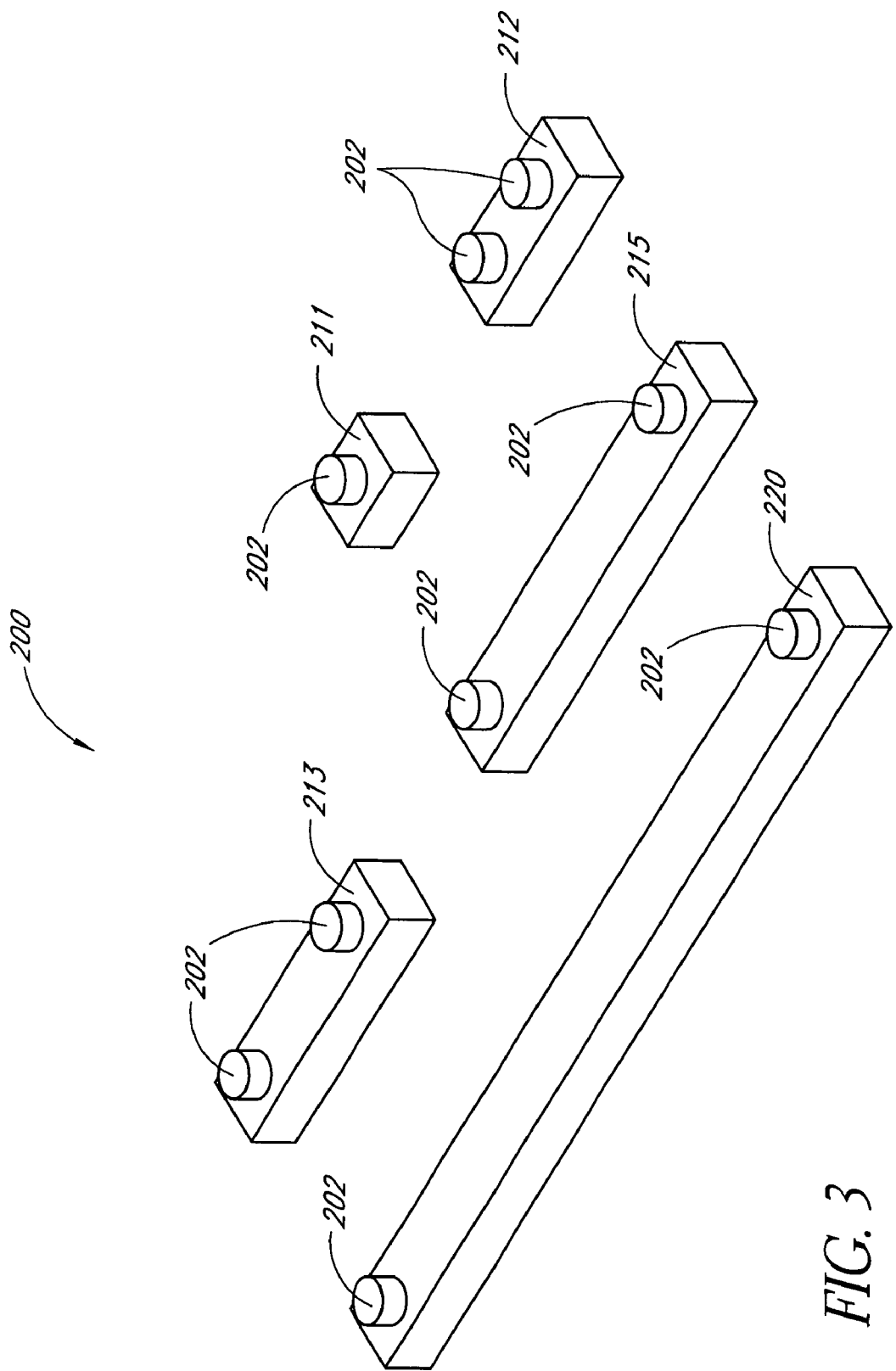
FIG. 3 is a perspective view of the bottom side of the number pieces illustrated in FIG. 2. This view shows one raised portion at each end of the bottom side of the number pieces.

The base array 100 is configured to receive one or more number pieces 200, examples of which are illustrated in FIGS. 2 and 3. In particular, FIG. 2 illustrates the top side of a plurality of exemplary number pieces 200, while FIG. 3 illustrates the bottom side of the same number pieces 200. As evident from FIG. 3, the bottom side of the number pieces 200 includes one or more raised portions 202 configured to engage or fit into the recessed receiving positions 102 of the base array 100, thereby facilitating smooth and secure yet easily removable and disengageable placement of the number pieces 200 in the rows 104 of the base array 100. In a modified embodiment, the bottom side of the number pieces 200 has at least one raised portion 202 or up to the number of raised portions that is equal to the number of units corresponding to that number piece. Additionally, as is evident from FIG. 2, the top side of the number pieces 200 includes recessed portions 204. This configuration facilitates stacking of the number pieces 200, which can help the student to compare the relative sizes of the number pieces 200.

In other embodiments, the receiving positions 102 in the base array can comprise other configurations, such as raised regions, or regions denoted by markings or other visual indicators on the base array. In such other embodiments, the pieces can comprise other configurations that would allow them to engage or fit into the receiving positions of the base array. For example, if the receiving positions in the base array of an embodiment is compromised of raised regions, the bottom of the pieces would be comprised of one or more recessed regions that would engage or fit with the raised regions in the base array. Likewise, in such other embodiments, the tops of the pieces consist of raised portions rather than recessed regions. In still other embodiments, the base array receiving positions 102 do not comprise recessed regions, but rather are indicated by a visual indicator (such as a printed grid) that is used to create visually distinct portions of the rows 104. In such embodiments, the rows comprise continuous troughs (with respect to the gap regions 108) into which the number pieces 200 can be inserted.

In modified embodiments, the number pieces 200 and the base array 100 use other engagement mechanisms to couple or mate the various components together. For example, in one embodiment the number pieces are configured to snap into place with other number pieces and with the base array, such that an audible sound is created. This configuration provides the student with an indication that the components have snapped into position, and also provides for a more secure fit than the loose-fitting, more easily removable configuration of other embodiments. In another modified embodiment, the number pieces 200 are configured to engage with the base array 100 using magnets. For example, in such embodiments magnetic materials (such as magnetized iron or steel) can be embedded in the base array 100 and the number pieces 200 to create a magnetic attractive force between such components. In yet another modified embodiment, the number pieces 200 are configured to adhere to the base array 100 using a hook-and-loop type attachment mechanism, such as Velcro® fasteners. Such non-loose-fitting configurations optionally allow the base array 100 to be positioned at an angle, or on a wall, without upsetting number pieces 200 that have been first positioned thereon.

Physical Configuration—Number Pieces.

Referring still to FIGS. 2 and 3, the individual number pieces 200 correspond to a number of units based on the number of receiving positions 102 that the number piece 200 will overlay when placed on the base array. Additionally, in the illustrated embodiment, the number of recessed portions 204 on the top side of the number piece 200 corresponds to the number of units associated with that number piece 200. For example, the number pieces 200 illustrated in FIGS. 2 and 3 comprise a 1-unit number piece 211, a 2-unit number piece 212, a 3-unit number piece 213, a 5-unit number piece 215 and a 10-unit number piece 220. As described above with reference to FIG. 3, in exemplary embodiments the bottom side of a number piece 200 can contain one or more raised portions at each end of the number piece. For example, in on embodiment, the bottom side of the number pieces 200 contains a quantity of raised portions proportional to the number of units corresponding to that number piece. Such raised portions allow the number pieces 200 to engage with the receiving positions 102 and to engage atop other number pieces 200.

Figure 4:
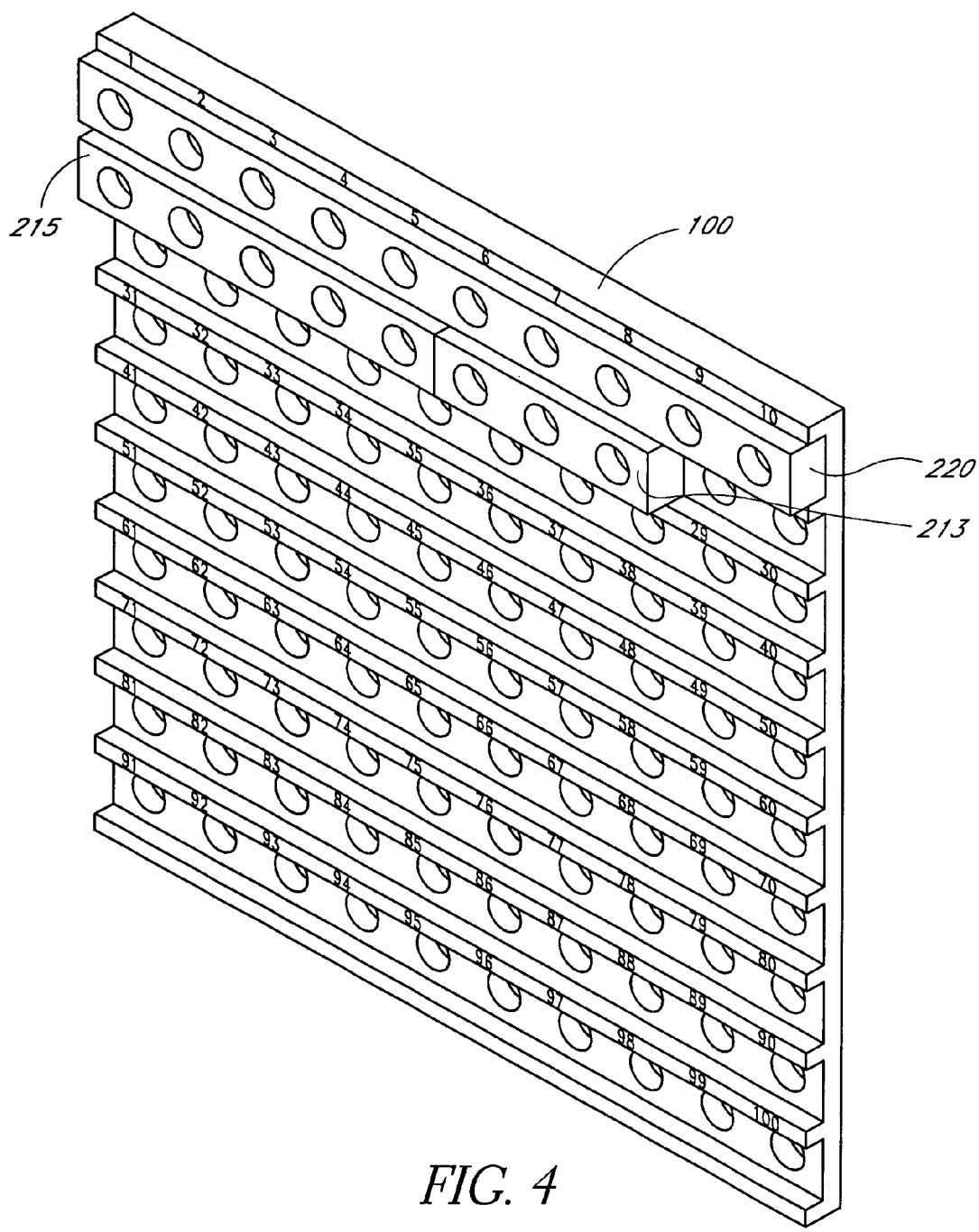
FIG. 4 is a perspective view of the exemplary base array of FIG. 1 having certain of the number pieces of FIGS. 2 and 3 positioned thereon.

In one embodiment, there are number pieces included representing numbers or units between one and ten, inclusive. In other embodiments, there are number pieces included for other numbers, such as numbers greater than ten, or fractions, decimals or negative numbers; in such embodiments, these number pieces represent other units such as tens, multiples of ten, negative numbers, decimal numbers or fractions. In a modified embodiment, the number pieces are color-coded such that the number pieces corresponding to a particular number have substantially the same color, thereby helping students to quickly and easily identify the pieces. FIG. 4 illustrates the 3-unit number piece 213, the 5-unit number piece 215 and the 10-unit number piece 220 positioned on the base array 100. Specifically, FIG. 4 could be used to illustrate that 10+5+3=18. In an exemplary embodiment, the number pieces 200 are dimensioned such that they fit smoothly into the rows of the base array 100.

Physical Configuration—Modified Base Arrays.

Figure 5:
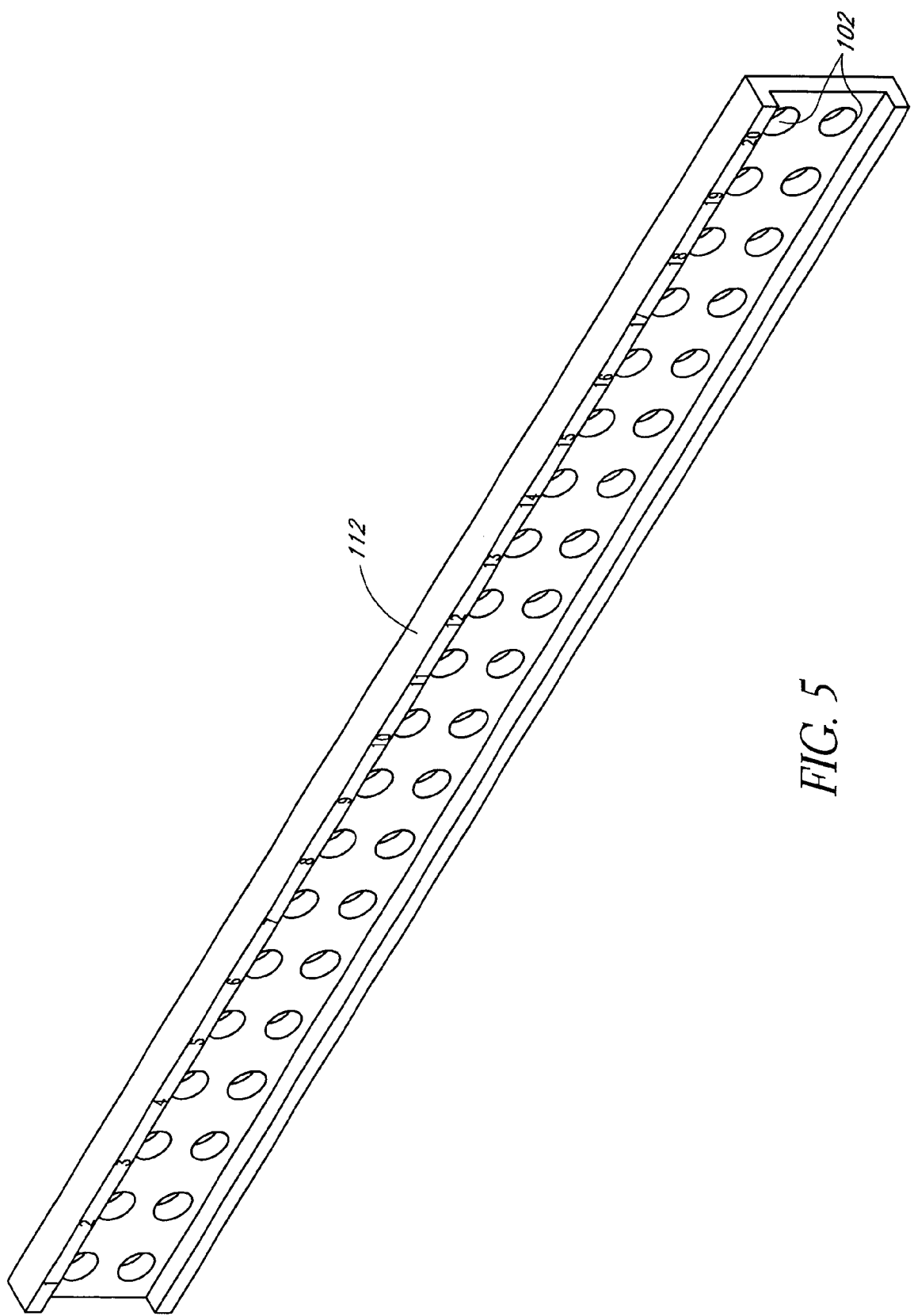
FIG. 5 is a perspective view of a linear base array having two rows and twenty receiving positions per row. This view contains two rows and twenty receiving positions per row.
Figure 6:
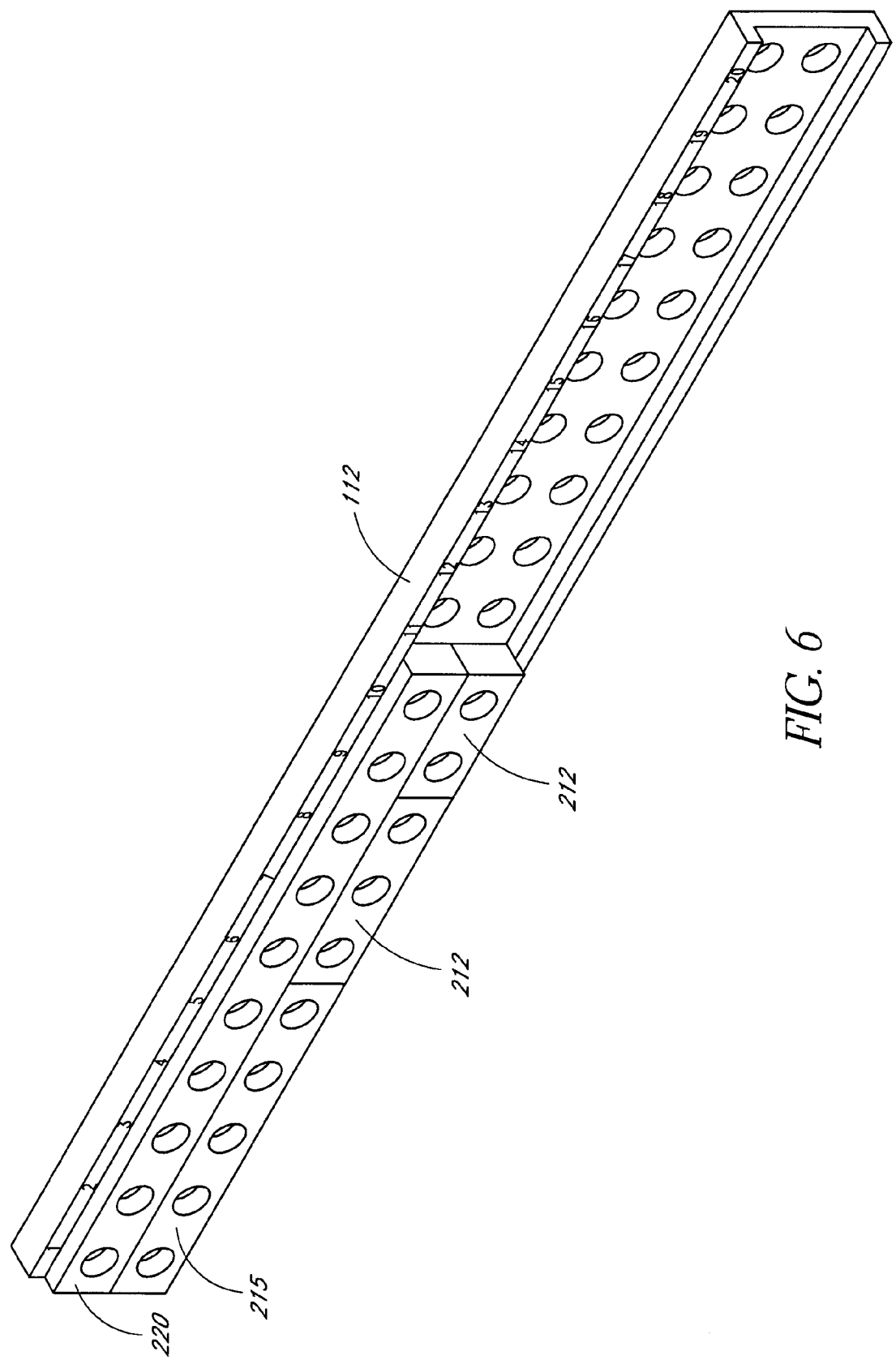
FIG. 6 is a perspective view of the exemplary base array of FIG. 5 having certain of the number pieces of FIGS. 2 and 3 positioned thereon.

FIG. 5 illustrates a linear base array 112 having two rows and twenty receiving positions 102 per row 104. However, in other embodiments the linear base array 112 can be configured with one row or more rows and one or more receiving positions. In an exemplary embodiment, the linear base array 112 does not include a gap region between the two rows, thereby facilitating comparisons of number pieces disposed on the two rows. In another embodiment, the linear base array would have a gap region between rows and could have more than or less than two rows. The linear base array 112 facilitates certain operations such as addition, subtraction, multiplication, division or determination of least common multiples without using substitution, as described in greater detail under "Methods of Use" below. The number pieces 200 illustrated in FIGS. 2 and 3 are compatible with the linear base array 112. For example, FIG. 6 illustrates a 2-unit number piece 212, a 3-unit number piece 213, a 5-unit number piece 215 and a 10-unit number piece 220 positioned on a linear base array 112.

Figure 7:
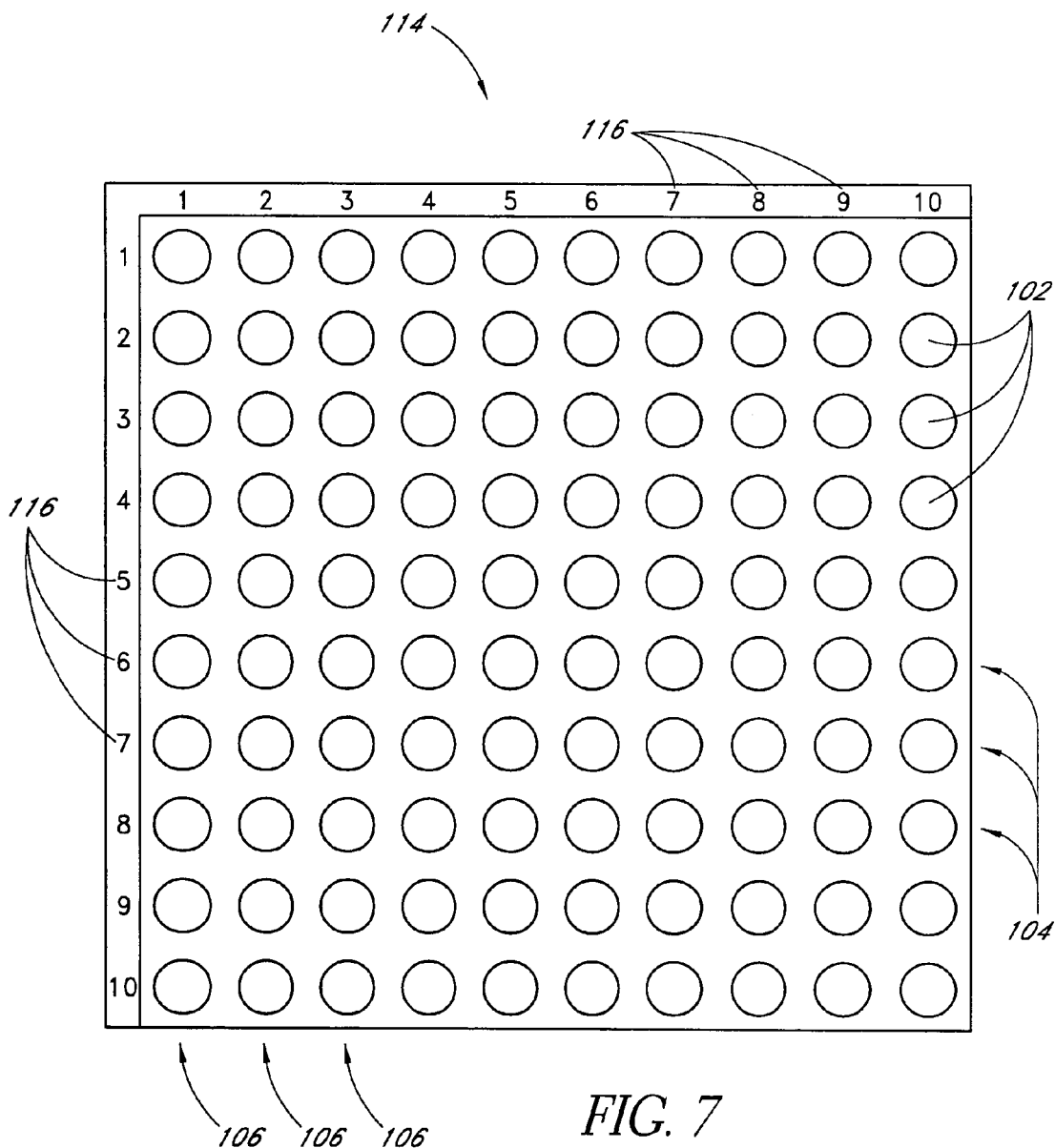
FIG. 7 is a perspective view of a continuous base array having ten rows and ten receiving positions per row and no gaps in between the rows.

FIG. 7 illustrates a continuous base array 114 that does not include a gap region between the rows, thereby enabling placement of the number pieces both horizontally and vertically. In addition, the receiving positions 102 on the continuous base array 114 are not individually numbered; rather, the heading numerical labels 116 correspond to the rows 104 and columns 106. In another embodiment, the numbers corresponding to each receiving position could be embedded within the receiving positions. The continuous base array 114 facilitates placement of number pieces 200 both horizontally, and vertically, which could, in turn, facilitate the teaching of multiplication through arrays, as described in greater detail below.

The modified base arrays described herein, and illustrated in FIGS. 5 and 7, can be configured as separate base arrays, or can be incorporated as the opposite side of the base array illustrated in FIG. 1.

Methods of Use—General.

As described above, understanding the concept of place value is useful in learning fundamental arithmetic and foundational mathematical concepts. An understanding of place value helps students group numbers into more manageable units, which makes it easier to both comprehend and mentally manipulate larger numbers. For example, it is easier for students to conceptualize or visualize three tens and five ones than it is to conceptualize thirty-five ones. Research studying inferior math performance by American students compared to their Japanese and Korean counterparts attributed part of the disparity to use of tens and ones grouping by the Asian students. By contrast, American students were found to be more reliant on rote counting methods.

Understanding place value also facilitates teaching arithmetic because performing arithmetic operations with numbers greater than 10 is usually easier if the operations are performed on the different units (for example, ones, tens, hundreds and so forth) separately. For example, adding 22 to 35 can be easily calculated mentally if a student adds the tens (20+30=50) and the ones (2+5=7) separately in a first step, and then adds those sums (50+7=57) in a second calculation to obtain the answer. In fact, it is very difficult to perform such calculations mentally without using such techniques. While the concept of place value might be clear to some adults, it can be a difficult concept for children, even after several years of math instruction. Indeed, at least one study found that 72% of second grade students did not understand place value concepts.

The mathematics teaching tool described herein helps teach and reinforce the concept of place value. In the base array layout described above that contains ten receiving positions per row, and illustrated in the accompanying figures, numbers greater than 10 are represented on the base array as tens and ones, thus encouraging students to think of double-digit numbers in such terms, and to group numbers accordingly. For example, the number 23 is expressed on the base array as two 10-unit number pieces positioned on the first two rows, and a remainder 3-unit number piece positioned on the third row. When the number pieces are positioned accordingly, it is clear that 23 is composed of two tens and three ones. Specifically, a student is thus shown that the 2 in 23 refers to the number of tens, and the 3 refers to the number of ones.

Exemplary Methods of Use for Illustrative Purposes—Addition of Single Digit Numbers.

To add single digit numbers using the mathematics teaching tool described herein, the student places number pieces corresponding to the numbers to be added in the base array starting at the receiving position labeled "1". Once the number pieces are positioned accordingly, the student can see the sum of the two numbers either by looking at the corresponding number labeled on the base array above or below the last receiving position on the last piece or by manually counting the number of indentations on the top of all the pieces. For example, to add 2+3, the student places a 2-unit number piece and a 3-unit number piece in the base array, and sees that the result is 5. The student can also place either number piece on the base array first and see that the same result is achieved either way, thus demonstrating the commutative property of addition (that is, 2+3=3+2).

The nature of the pieces also facilitates teaching math facts, even without the base array. For example, a student could start with a number like 9 and attempt to find all of the number pairs that "make" 9. The student could stack an 8 and 1 on top of the 9 and see that it is equivalent, and then a 7 and 2 on top of that and so on until they have identified all of the numbers that sum to 9. In effect they have learned the 5+4=6+3=7+2=8+1=9.

When the sum of the numbers exceeds the number of receiving positions per row in the base array (for example, ten in the embodiment illustrated in FIG. 1), a different approach is used because the student runs out of space on the first row. In an exemplary method of use, the student is taught to solve this dilemma by substituting smaller single digit numbers for the second number to be added. For example, to calculate 8+7 when using the base array illustrated in FIG. 1, the student can first place the 8-unit number piece on the base array, which then leaves two unused spaces left in the first row. The student cannot place the 7-unit number piece in the same row because the row only leaves space for a 2-unit number piece. The student compares a 2-unit number piece to a 7-unit number piece, for example by holding the 2-unit number piece against or stacking the 2-unit number piece atop the 7-unit number piece. The student is taught to find the number piece that, when placed next to the 2-unit number piece, equals the length of the remainder of the 7-unit number piece. The student identifies the 5-unit number piece, perhaps by stacking it on top of the 7-unit number piece adjacent to the 2-unit number piece. This method of replacing a larger number with two smaller number pieces will be referred to herein as the "substitution method". The student then places the 2-unit number piece in the receiving positions labeled 9 and 10, and places the 5-unit number piece in the next row, and sees that the sum of 8 and 7 is 15.

This process can also be used to teach the associative property of addition, which implies that a number is the sum of its components (for example, 8+7=8+2+5). This can also be seen as an extension of the concept of grouping into tens and ones as discussed above: in this example 8+7 was "grouped" into 10+5. A good way to teach students to use this associative property approach of regrouping numbers using tens is to teach them to think in terms of "making tens" or "getting to tens". In this case 2 was needed to "make tens" with 8, leaving the remaining 5. It is easier to solve the problem when it is viewed as 10+5 instead of 8+7. Students quickly learn, by virtue of an array that contains precisely 10 receiving positions per row, that they only need to visualize "filling up" a row in order to "get to ten."

Exemplary Methods of Use for Illustrative Purposes—Addition of Double Digit Numbers.

Double digit numbers can be added in a similar manner as single digit numbers, even if there are no number pieces in a particular embodiment corresponding to numbers greater than ten. For example, to calculate 16+13, the student has several approaches he or she can use to solve the problem.

First, the student can use the substitution method described previously. The student knows that 16 is comprised of a 10-unit number piece and a 6-unit number piece and that 13 is comprised of a 10-unit number piece and a 3-unit number piece. Accordingly, the student can position the sixteen first, and then attempt to add the thirteen thereto (or vice-versa). After first positioning the 10-unit and the 6-unit number piece, the student can then attempt to position the other 10-unit number piece and see it needs to be substituted by a 4-unit number piece and a 6-unit number piece to fill in the four empty spaces in the second row after 16, with the 6-unit number piece continuing onto the third row. The remaining 3-unit number piece is then placed in the third row after the 6-unit number piece, totaling 29.

In yet another solution that places particular emphasis on learning place value concepts, units such as tens and ones are added separately. Using the previous example of 16+13, after separately measuring out the 16 and the 13, the student pools the combined pieces together: two 10-unit number pieces, a 6-unit number piece and a 3-unit number piece. The simplest way to represent this sum is to first position the two 10-unit number pieces and then the 4-unit and 3-unit number pieces. This method will likely be preferred by students over the solution discussed in the paragraph above because it is quicker in that it eliminates the need to substitute pieces. Using this technique, the student learns the method of adding tens and ones separately, thereby enabling easier mental calculations. Embodiments with rows containing ten receiving positions encourage a student to visualize and implement this easier and more efficient method of calculating.

More difficult problems such as 28+39 could involve use of both substitution and separate operations on tens and ones. The student would first pool the pieces representing the two numbers (two 10-unit number pieces and one 8-unit number piece plus three 10-unit number pieces and one 9-unit number piece). The student could first substitute the 8-unit and 9-unit number pieces with a 10-unit number piece and a 7-unit number piece, resulting in six 10-unit number pieces and one 7-unit number piece, which they will find totals 67 after placing the number pieces on the base array. This process avoids use of the traditional borrowing and carrying method, which is difficult to perform mentally with larger numbers.

Exemplary Methods of Use for Illustrative Purposes—Subtraction.

Subtraction can be explained to the student as the opposite of addition. There are several methods for performing subtraction using the mathematics teaching tool described herein. Certain subtraction methods take advantage of the fact that the number pieces can be stacked. Consider, for example, 8−3. In this case, the student first positions the 8-unit number piece on the base array and then "works backwards": the 3-unit number piece is positioned atop the 8-unit number piece, beginning at the end of the 8-unit number piece. The remaining number of recessed portions on the 8-unit number piece that are uncovered is 5, thus providing the solution. The solution can also be quickly seen by looking at the number labeled on the base array corresponding to the last uncovered receiving position on the 8-unit number piece. When using numbers greater than ten, the student can use the substitution method introduced previously.

For example, to subtract 7 from 13, the student starts at 13 and works backwards. In this example, there are three spaces to fill on the second row; the user can substitute the 3-unit number piece and a 4-unit number piece for the 7-unit number piece. A 3-unit number piece is first positioned in the second row (on top of the existing 3-unit number piece), and then the 4-unit number piece is positioned at the right of the first row. This reveals the remainder of 6 receiving positions in the original 10-unit number piece that remain uncovered. The solution can also be quickly discovered by seeing that the number 6 is the number labeled on the base array corresponding to the last uncovered receiving position on the 13-unit number piece. The concept of making tens learned in addition can be used here, albeit in a backwards manner—the student immediately knows that it takes 3 (of the 7) to get back to 10 from 13, and that the remaining 4 (of the 7) subtracted from 10 results in a solution of 6. When subtracting double-digit numbers, the student can work backwards as expounded above, or can explore another method involving separating units such as tens and ones in a manner similar to what was previously explained in the context of addition.

Another method for performing subtraction invites the student to inquire as to the difference between two numbers. Consider again, for example, 8−3. The student first positions the 8-unit number piece, and then positions the 3-unit number piece atop the 8-unit number piece. The student then can see or count that there are five uncovered receiving positions on the 8-unit number piece, so 8 is 5 more than 3, or the difference between 8 and 3 is 5.

Exemplary Methods of Use for Illustrative Purposes—Multiplication of Single Digit Numbers.

Multiplication can be explained to a student as a variation of addition, where x multiplied by y means one must add x quantity of y-unit number pieces, or y quantity of x-unit number pieces. In order words, the student must add together x "sets of" y. For example, 2×3 means the sum of two 3-unit number pieces, and 3×2 means the sum of three 2-unit number pieces. The student adds these numbers and sees that the result is six. This method can also be used to demonstrate to the student the commutative property of multiplication: two products are equivalent regardless of the order of operation. That is, by stacking the two 3-unit number pieces atop the three 2-unit number pieces (using the base array 100 or not), the student can see that both sets of sums are of equal length and therefore equal to the same product. When the product exceeds the number of receiving positions per row on the base array, the substitution method, as expounded above, can be applied.

The pieces can also be used to help students find the Least Common Multiple ("LCM"). To find the LCM of 2 and 3, students could place 3-unit number pieces on the base array and then start placing 2-unit number pieces on top. The first number at which they equal one another is 6, the LCM. Note that the pieces could have been placed on a flat surface without the base array, although the base array makes it easier to quickly identify the solution due to the labeled numbers above or below each receiving position.

By using the embodiment of the continuous base array 114 illustrated in FIG. 7, the student can also be taught using the "multiplication by arrays" concept. Specifically, students can be shown that the area of a rectangle is the product of its length×width. For example, to find the product of 3×2, the student creates a rectangle on the continuous base array 114 by placing number pieces 200 covering 3 columns across and 2 rows down, starting at the top left corner and using the numerical labels 116 on the rows and columns. After creating the array, students calculate the area by counting the recessed portions 204 on the top of the number pieces 200 in the array. In array notation the "×" symbol refers to "by", as in a "3 by 2" array.

Because the continuous base array 114 can hold pieces either horizontally or vertically, this array can be represented in more than one way. For example, a 3×2 array could be represented by two 3-unit number pieces laid out horizontally on top of one another or by three 2-unit number pieces laid out vertically along side one another. By seeing that both arrays results in a rectangle of the same area, the student can better grasp the commutative property of multiplication. The student could also place six 1-unit pieces. This concept and process can also be taught by placing the number pieces 200 on a flat surface without the continuous base array 114, although use of the continuous base array 114 makes it easier to check the dimensions of the array.

Exemplary Methods of Use for Illustrative Purposes—Multiplication of Double Digit Numbers.

Multiplication involving numbers greater than ten can be taught similarly to multiplication of single digit numbers. Numbers greater than 10 can be substituted by their components using the distributive property. Consider, for example, 3×12. The student would use a 10-unit number piece and a 2-unit number piece to represent the number 12. The student then learns that 3×12 means three "sets of" 12 or three sets of the 10-unit number piece and 2-unit number piece combination. The student learned, while adding double-digit numbers, to separate the tens and the ones and to add the components separately. Likewise, the student will learn to perform multiplication on the tens and ones separately: (3×10)+(3×2)=30+6=36. In this case, the student would place the three 10-unit number pieces on the base array to obtain 30, and then would place the three 2-unit number pieces on the base array to obtain a total of 36. As described above, the various embodiments of the mathematics teaching tool described herein emphasize that separating tens and ones is a powerful way to make mental calculations easier, faster and often more accurate. In addition, this technique can be used to help illustrate the distributive property of multiplication, in this case 3×(10+2)=(3×10)+(3×2).

Exemplary Methods of Use for Illustrative Purposes—Division.

Division invites the student to inquire, "How many x-unit number pieces are there in y?" Consider, for example, 8÷2. The student positions 2-unit number pieces until the last receiving position of the last number piece corresponds to the number 8, and can then count that there are four 2-unit number pieces in 8. Using this method, the inverse relationship between division and multiplication becomes clear: if 4×2 or four 2-unit number pieces is 8, than there must be four 2-unit number pieces in 8. Another method is to start at 8, either with the base array alone or by placing an 8-unit number piece on it, and then perform a repeated subtraction of 2 by placing 2-unit number pieces working backwards on the base array at the receiving position marked 8 or on the 8-unit number piece until the student has completely covered all of the 8 receiving positions labeled 1 through 8 or the entire 8-unit number piece and sees 4 2-unit number pieces have been subtracted.

Exemplary Methods of Use for Illustrative Purposes—Linear Base Array.

Use of the linear base array (illustrated in FIGS. 5 and 6), which can comprise more than ten receiving positions per row, facilitates early instruction in addition, subtraction, multiplication and division when place value and base ten concepts are not yet being emphasized. Instead, the linear base array allows a student to first concentrate on mastering the basic arithmetic operations because the user can avoid using the substitution method when the calculations involve numbers greater than ten. Once the student has mastered the operations, however, use of the base array 100 is preferred as it reinforces the concepts of place value and the techniques of "getting to tens" and performing arithmetic operations on tens and ones separately.

Methods of Manufacture.

In an exemplary embodiment, the base array 100 and number pieces 200 comprise plastic, and are manufactured using an injection molding process. In other embodiments, these components can comprise other materials (such as wood, foam or composite materials), or combinations of other materials (such as plastic and wood), and can be manufactured using other techniques. In an exemplary embodiment, the numerical labels 110 on the base array 100 are printed on removable inserts or provided on individual removable self-adhesive labels, although in a modified embodiment the numerical labels 110 are applied directly to the base array 100 itself (such as by painting, affixing labels, or mechanically carving/stamping). Such removable inserts or removable labels would allow a teacher or student to change the numbers corresponding to the base array receiving positions. Instead of using numbers 1–100 for a base array, different numbers can be used, including decimals, fractions or negative numbers. The numbers corresponding to each receiving position in the base array could be placed either above or below each row, depending on teacher or student preference.

In a modified embodiment, the base array 100 and number pieces 200 comprise planar objects, thereby facilitating pictorial representation of the mathematical concepts discussed herein. For example, in one such embodiment, the base array comprises an overhead projector transparency, and the number pieces comprise smaller transparencies configured to be overlaid onto the base array, thereby facilitating demonstration of the mathematics teaching tool to a large audience. In another example, circles can be used to represent the receiving positions and rectangles can be used to represent the rows of the base array (and the gaps between the rows, if appropriate), with the numerical labels positioned in the appropriate location. In such embodiments, the methods for teaching mathematical concepts described herein can be performed using a two-dimensional replication of the base array on, for example, a printed page, a computer display, a marker board, a dry-erase board or an overhead transparency. In other embodiments, the base array can be enlarged to facilitate demonstration of the mathematics teaching tool to a large audience. For example, an enlarged base array can be mounted on a wall or on an easel. In these embodiments, the number pieces can be represented by writing on or otherwise modifying the appearance of the two-dimensional display. For example, in embodiments wherein the base array and number pieces are reproduced on a computer display, software can be used to manipulate the displayed arrangement of the number pieces.

Scope of the Invention.

While the foregoing detailed description has described several embodiments of the present invention, it should be understood that the above description is illustrative only and is not limiting of the disclosed invention. It will be appreciated that the specific configurations and operations disclosed can differ from those described above, and that the methods described herein can be used in contexts other than mathematics education.

I claim:

1. A mathematics education apparatus comprising:
a base array comprising a plurality of rows, wherein each row comprises ten receiving positions; and
a plurality of number pieces associated with a plurality of corresponding numbers, including at least one number piece corresponding to each of the numbers one through ten, wherein the number pieces have a linear length that is proportional to the number corresponding to that number piece, and wherein the number pieces are configured to cover a quantity of receiving positions on the base array equal to the number corresponding to that number piece;
wherein the receiving positions on the base array are labeled with number labels, and wherein the number labels are printed on a labeling apparatus that can be removably attached to the base array.

2. The mathematics education apparatus of claim 1, wherein the rows are oriented vertically.

3. The mathematics education apparatus of claim 1, further comprising an instruction apparatus containing instructions for using the array and number pieces to teach mathematical concepts.

4. The mathematics education apparatus of claim 1, wherein the base array is substantially two-dimensional.

5. The mathematics education apparatus of claim 1, wherein the number pieces are substantially two-dimensional.

6. The mathematics education apparatus of claim 1, wherein the receiving positions on the base array are setoff from each other with a visual indicator.

7. The mathematics education apparatus of claim 1, wherein the number pieces are configured to engage the base array using magnets.

8. The mathematics education apparatus of claim 1, wherein the number pieces are configured to engage the base array using a removable fastener system.

9. The mathematics education apparatus of claim 1, wherein the plurality of base array rows are the same length.

10. The mathematics education apparatus of claim 1, wherein the base array further comprises a gap region positioned between each of the plurality of rows.

11. The mathematics education apparatus of claim 1, wherein the base array comprises ten rows.

12. The mathematics education apparatus of claim 1, wherein the number labels are disposed within the receiving position.

13. The mathematics education apparatus of claim 1, wherein the receiving positions are arrayed in a plurality of columns.

14. The mathematics education apparatus of claim 1, wherein the receiving positions are arrayed in a plurality of columns, and wherein each of the base array columns has a numerical label.

15. The mathematics education apparatus of claim 1, wherein each of the base array rows has a numerical label.

16. The mathematics education apparatus of claim 1, wherein the receiving positions on the base array comprise recessed portions, and wherein the number pieces include raised portions, such that the raised portions of the number pieces can be received into the recessed portions of the base array.

17. The mathematics education apparatus of claim 1, wherein the receiving positions on the base array comprise raised portions, and wherein the number pieces include recessed portions, such that the recessed portions of the number pieces can receive the raised portions of the base array.

18. The mathematics education apparatus of claim 1, wherein:
the receiving positions on the base array comprise recessed portions, and wherein the number pieces include raised portions, such that the raised portions of the number pieces can be received into the recessed portions of the base array; and
the number pieces further comprise recessed portions on a surface opposite the number piece raised portions, such that a plurality of number pieces can be stacked atop each other.

19. The mathematics education apparatus of claim 1, wherein:
the receiving positions on the base array comprise raised portions, and wherein the number pieces include recessed portions, such that the recessed portions of the number pieces can receive the raised portions of the base array; and
the number pieces further comprise raised portions on a surface opposite the number piece recessed portions, such that a plurality of number pieces can be stacked atop each other.

20. The mathematics education apparatus of claim 1, wherein the number pieces are colored according to their corresponding number, such that number pieces corresponding to a particular number have substantially the same color.

21. A method for teaching mathematical operations on a plurality of numbers, the method comprising:
providing a base array comprising a plurality of rows, wherein each row comprises ten receiving positions:
providing a plurality of number pieces associated with a plurality of corresponding numbers, wherein the number pieces have a linear length that is proportional to the number associated with that number piece;
labeling the receiving positions on the base array with number labels, wherein the number labels are removably attachable from the base array; and
disposing number pieces on the base array, wherein the number pieces correspond to the numbers on which a mathematical operation is to be performed.

22. The method of claim 21, wherein the mathematical operation includes at least one of addition, subtraction, multiplication and division.

23. The method of claim 21, wherein images of the number pieces and the base array are computer-generated, and wherein disposing the number pieces on the base array is performed using software designed to manipulate the images of the number pieces and the base array.

24. A mathematics education kit comprising:
an array comprising a plurality of receiving positions, the receiving positions arranged in an array of rows; and
a plurality of number pieces associated with a plurality of corresponding numbers, wherein the number pieces have (a) a dimension that is proportional to the number of units corresponding to that number piece, and (b) a quantity of number piece receiving positions that is equal to the number of units corresponding to that number piece;
wherein the number pieces are configured to overlay a quantity of receiving positions on the base array equal to the number of units corresponding to that number piece;
wherein the number pieces are stackable atop each other using the number piece receiving positions; and
wherein the receiving positions on the array are labeled with numbers, and wherein the receiving position labels are disposed adjacent to the receiving position.

25. The mathematics education kit of claim 24, wherein the plurality of corresponding numbers comprise negative numbers.

26. The mathematics education kit of claim 24, wherein the plurality of corresponding numbers comprise fractions.

27. The mathematics education kit of claim 24, wherein the plurality of corresponding numbers comprise decimal numbers.

28. The mathematics education kit of claim 24, wherein the receiving position labels are painted on the array.

29. The mathematics education kit of claim 24, wherein the receiving positions on the array are setoff from each other with a visual indicator.

30. The mathematics education kit of claim 24, wherein the array is substantially two-dimensional.

31. The mathematics education kit of claim 24, wherein the number pieces are substantially two-dimensional.

32. The mathematics education kit of claim 24, further comprising an instruction apparatus containing instructions for using the array and number pieces to teach mathematical concepts.

33. The mathematics education kit of claim 24, wherein the array of rows are oriented vertically.

34. The mathematics education kit of claim 24, wherein the number pieces are configured to engage the array using a removable fastener system.

35. The mathematics education kit of claim 24, wherein the number pieces are configured to engage the array using magnets.

36. The mathematics education kit of claim 24, wherein the plurality of array rows are the same length.

37. The mathematics education kit of claim 24, wherein each of the array rows have the same number of receiving positions therein.

38. The mathematics education kit of claim 24, wherein the array further comprises a gap region positioned between each of the plurality of rows.

39. The mathematics education kit of claim 24, wherein the receiving positions are arrayed in a plurality of columns, and wherein each of the array columns has a numerical label.

40. The mathematics education kit of claim 24, wherein each of the array rows has a numerical label.

41. The mathematics education kit of claim 24, wherein the receiving positions on the array comprise recessed portions, and wherein the number pieces include raised portions, such that the raised portions of the number pieces can be received into the recessed portions of the array.

42. The mathematics education kit of claim 24, wherein:
the receiving positions on the array comprise recessed portions, and wherein the number pieces include raised portions, such that the raised portions of the number pieces can be received into the recessed portions of the array; and
the number pieces further comprise recessed portions on a surface opposite the number piece raised portions, such that a plurality of number pieces can be stacked atop each other.

43. The mathematics education kit of claim 24, wherein the receiving positions on the array comprise raised portions, and wherein the number pieces include recessed portions, such that the recessed portions of the number pieces can receive the raised portions of the array.

44. The mathematics education kit of claim 24, wherein:
the receiving positions on the array comprise raised portions, and wherein the number pieces include recessed portions, such that the recessed portions of the number pieces can receive the raised portions of the array; and
the number pieces further comprise raised portions on a surface opposite the number piece recessed portions, such that a plurality of number pieces can be stacked atop each other.

45. The mathematics education kit of claim 24, wherein the number pieces are colored according to their corresponding number, such that all number pieces corresponding to a particular number have substantially the same color.

46. The mathematics education kit of claim 24, wherein the array comprises ten rows.

47. The mathematics education kit of claim 24, wherein the receiving positions are arrayed in a plurality of columns.

48. A method for teaching a mathematical operation on a plurality of numbers, the method comprising:
providing a base array having a plurality receiving positions;
providing a plurality of number pieces associated with a plurality of corresponding numbers, wherein the number pieces have a dimension that is proportional to the number associated with that number piece;
labeling the receiving positions on the base array with number labels, wherein the number labels are positioned adjacent to the corresponding receiving position;
placing a first number piece on the array such that the first number piece covers a quantity of receiving positions on the base array equal to the number associated with the first number piece; and
stacking a second number piece on the first number piece, wherein the second number piece covers a quantity of receiving positions on the first number piece equal to the number associated with the second number piece, wherein the first and second number pieces correspond to the numbers on which the mathematical operation is to be performed.

49. The method of claim 48, wherein the mathematical operation includes at least one of addition subtraction, multiplication and division.

50. The method of claim 48, wherein the mathematical operation comprises addition and subtraction.

51. A mathematics education kit comprising:
an array comprising a plurality of receiving positions, the receiving positions arranged in an array of rows; and
a plurality of number pieces associated with a plurality of corresponding numbers, wherein the number pieces have a dimension that is proportional to the number of units corresponding to that number piece, and wherein the number pieces are configured to overlay a quantity of receiving positions on the base array equal to the number of units corresponding to that number piece;
wherein the receiving positions on the array are labeled with numbers, and wherein the receiving position labels are printed on a labeling apparatus that can be removably attached to the array.

52. A mathematics education kit comprising:
an array comprising a plurality of base array receiving positions, the base array receiving positions arranged in an array of rows; and
a plurality of number pieces associated with a plurality of corresponding numbers, wherein the number pieces have (a) a dimension that is proportional to the number of units corresponding to that number piece, and (b) a quantity of number piece receiving positions that is equal to the number of units corresponding to that number piece;
wherein the number pieces are configured to overlay a quantity of base array receiving positions that is equal to the number of units corresponding to that number piece;
wherein the number pieces are stackable atop each other by inserting a portion of a first stacked number piece into a number piece receiving position of a second stacked number piece; and
wherein the receiving positions on the array are labeled with numbers, and wherein the receiving position number labels are disposed adjacent to the corresponding receiving position.

53. The mathematics education kit of claim 52, wherein:
the base array receiving positions in a first row are labeled with a first series of numbers;
the base array receiving positions in a second row are labeled with a second series of numbers; and
the second series of numbers is consecutive to the first series of numbers.

54. A mathematics education kit comprising:
an array comprising a plurality of base array receiving positions, the base array receiving positions arranged in an array comprising a plurality of rows; and
a plurality of number pieces associated with a plurality of corresponding numbers, wherein the number pieces have (a) a dimension that is proportional to the number of units corresponding to that number piece, and (b) a quantity of number piece receiving positions that is equal to the number of units corresponding to that number piece;
wherein the number pieces are configured to overlay a quantity of base array receiving positions that is equal to the number of units corresponding to that number piece;
wherein the number pieces are stackable atop each other by inserting a portion of a first stacked number piece into a number piece receiving position of a second stacked number piece;
wherein the receiving positions on the array are labeled with receiving position number labels; and
wherein the receiving position number labels are positioned (a) adjacent to the corresponding receiving position, and (b) between two rows in the array.

55. The mathematics education kit of claim 54, wherein the receiving position number labels are positioned on a raised element located between two rows in the array.

* * * * *